United States Patent
Sheng et al.

(10) Patent No.: US 11,292,679 B2
(45) Date of Patent: Apr. 5, 2022

(54) SHEET FEEDER AND CONTROL METHOD OF PROCESSOR OF THE SHEET FEEDER

(71) Applicant: AVISION INC., Hsinchu (TW)

(72) Inventors: Shao-Lan Sheng, Hsinchu (TW); Chin-Chu Chiu, Hsinchu County (TW)

(73) Assignee: AVISION INC., Hsinchu (TW)

(*) Notice: Subject to any disclaimer, the term of this patent is extended or adjusted under 35 U.S.C. 154(b) by 379 days.

(21) Appl. No.: 16/511,385

(22) Filed: Jul. 15, 2019

(65) Prior Publication Data
US 2020/0079606 A1    Mar. 12, 2020

(30) Foreign Application Priority Data
Sep. 7, 2018 (TW) .................... 107131456

(51) Int. Cl.
*B65H 3/06* (2006.01)
*H04N 1/00* (2006.01)
*B65H 5/06* (2006.01)

(52) U.S. Cl.
CPC .............. *B65H 3/06* (2013.01); *B65H 5/062* (2013.01); *H04N 1/0057* (2013.01);
(Continued)

(58) Field of Classification Search
CPC ........... H04N 1/00602; H04N 1/00612; H04N 1/00567; H04N 1/0057; H04N 1/00604;
(Continued)

(56) References Cited

U.S. PATENT DOCUMENTS 4,933,725 A * 6/1990 Ito ..................... G03G 15/50
271/9.12
5,848,789 A * 12/1998 Ochi ..................... B65H 7/06
271/258.01
(Continued)

FOREIGN PATENT DOCUMENTS

CN    1760767 A    4/2006
CN    1817770 A    8/2006
(Continued)

OTHER PUBLICATIONS

Office Action dated Feb. 6, 2020 in CN Application No. 201811527665.2.

*Primary Examiner* — Negussie Worku
(74) *Attorney, Agent, or Firm* — Muncy, Geissler, Olds & Lowe, P.C.

(57) ABSTRACT

In a sheet feeder, an input passage has input and output ends and an input location. A first feeder module includes: a first input roller disposed on the input end; a first output roller disposed on the output end; and a first sensing device being disposed near the first input roller and generating a first signal transmitted to a processor upon sensing presence of a first medium. A second feeder module includes: a second input roller disposed on the input end; a second output roller disposed on the output end; and a second sensing device being disposed at the input location and generating a second signal transmitted to the processor upon sensing presence of a second medium. An image acquiring device acquires an image of the first or second medium. The processor controls enabled and disabled states of the first and second feeder modules. A control method of the processor is also provided.

13 Claims, 4 Drawing Sheets

(52) U.S. Cl.
CPC ..... *H04N 1/00588* (2013.01); *H04N 1/00599* (2013.01); *H04N 1/00602* (2013.01); *H04N 1/00689* (2013.01); *H04N 1/00694* (2013.01); *H04N 1/00777* (2013.01); *B65H 2801/06* (2013.01)

(58) Field of Classification Search
CPC ............. H04N 1/0061; H04N 1/00618; H04N 1/00575; H04N 1/00806; H04N 1/00572; H04N 1/00578; H04N 1/0058; H04N 1/00631; H04N 1/12; H04N 1/193; H04N 2201/0081; B65H 2511/11; B65H 2513/42; B65H 1/04; B65H 2220/01; B65H 2220/02; B65H 2405/3321; B65H 3/0669; B65H 3/0684; B65H 85/00; B65H 2301/3332; B65H 2801/06; B65H 2801/39; B65H 29/58; B65H 29/64; B65H 43/00; B65H 7/02; B65H 7/20; B65H 2301/33312
USPC ........................................................ 358/498
See application file for complete search history.

(56) References Cited

U.S. PATENT DOCUMENTS

| | | | | |
|---|---|---|---|---|
| 8,011,655 | B2* | 9/2011 | Ohishi | B65H 5/062 271/259 |
| 2006/0214356 | A1 | 9/2006 | Yasukawa et al. | |
| 2007/0247675 | A1* | 10/2007 | Ishio | H04N 1/00567 358/486 |
| 2008/0193181 | A1* | 8/2008 | Jeong | B65H 85/00 399/401 |
| 2010/0097608 | A1* | 4/2010 | Schellhorn | G03F 7/70725 356/401 |
| 2015/0192858 | A1* | 7/2015 | Van De Kerkhof | G01N 21/956 355/67 |
| 2016/0152425 | A1 | 6/2016 | Inoue | |
| 2017/0260015 | A1* | 9/2017 | Shimazu | G03G 15/6529 |
| 2018/0207948 | A1* | 7/2018 | Sheng | B41J 2/2103 |
| 2020/0084328 | A1* | 3/2020 | Sheng | H04N 1/00604 |

FOREIGN PATENT DOCUMENTS

| | | |
|---|---|---|
| CN | 201002894 Y | 1/2008 |
| CN | 201031087 Y | 3/2008 |
| CN | 101309340 A | 11/2008 |
| CN | 103685835 A | 3/2014 |
| CN | 105645146 A | 6/2016 |
| CN | 209275721 U | 8/2019 |
| JP | H08119492 A | 5/1996 |
| JP | 2005178953 A | 7/2005 |
| JP | 4481480 B2 | 6/2010 |
| JP | 6107544 B2 | 4/2017 |

* cited by examiner

SHEET FEEDER AND CONTROL METHOD OF PROCESSOR OF THE SHEET FEEDER

CROSS-REFERENCE TO RELATED APPLICATIONS

This application claims priority of No. 107131456 filed in Taiwan R.O.C. on Sep. 7, 2018 under 35 USC 119, the entire content of which is hereby incorporated by reference.

BACKGROUND OF THE INVENTION

Field of the Invention

This disclosure relates to a sheet feeder and a control method of a processor of the sheet feeder, and more particularly to a sheet feeder having a straight and linear input passage, and a control method of a processor of the sheet feeder.

Description of the Related Art

When a user uses an automatic document feeder (ADF) of a peripheral to perform data processing and if the ADF feeds the sheet in a straight line without the conventional sheet reversal, the ADF has the advantage of processing both an ordinary medium and a hard medium (e.g., an identification card, a credit card or the like). However, the ADF has the drawback that the output roller continuously outputs the medium until the medium leaves the input passage. At this time, the medium travelling toward the outside of the sheet output location has the moving inertia, and the small-area medium, such as the identification card or the credit card, accidentally flies out and falls down or gets lost, and it is troublesome when such the data medium gets damaged or lost.

BRIEF SUMMARY OF THE INVENTION

It is therefore an objective of this disclosure to provide a sheet feeder and a control method of a processor of the sheet feeder, which prevent a small data medium, such as an identification card, a credit card, a passport or the like, from flying out of an output end of an automatic document feeder (ADF), so that the user can use the ADF to process the medium without worry, and the above-mentioned problem can be solved.

To achieve the above-identified objective, this disclosure provides a sheet feeder having a supply tray, a discharge tray, an input passage, a first feeder module, a second feeder module and an image acquiring device. The first feeder module includes: a first input roller disposed on an input end of the input passage; a first output roller disposed on an output end of the input passage; and a first sensing device being disposed near the first input roller, and generating a first signal transmitted to a processor upon sensing presence of a first medium. The second feeder module includes: a second input roller disposed on the input end of the input passage; a second output roller disposed on the output end of the input passage; and a second sensing device being disposed at an input location of the input passage and generating a second signal transmitted to the processor upon sensing presence of a second medium. The image acquiring device disposed downstream of the first input roller acquires an image of the first medium or the second medium. The processor controls enabled states and disabled states of the first feeder module and the second feeder module. The first sensing device and the second sensing device are disposed on the same input end.

To achieve the above-identified objective, this disclosure also provides a control method of the processor of the sheet feeder. The method includes steps of: receiving the second signal without receiving the first signal; disabling the first feeder module and rotating the second input roller; and stopping rotating of the second output roller after a predetermined time has elapsed to make the second medium be still in direct contact with the second output roller.

In summary, when the sheet feeder of the automatic document feeder has the first feeder module of processing the ordinary medium, and the second feeder module of processing the small-area medium, the two different feeder modules share the same sheet inlet and the same sheet outlet of the sheet feeder to transport the media, and it is unnecessary to provide two different paths for the media and thus to increase the size of the automatic document feeder. In addition, the user is free from the trouble that the small-area medium flies out of the sheet outlet, and the user's trust in using the ADF can be increased.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Directional terms, such as up, down, left, right, front, back and the like, mentioned in the following examples, just refer to the orientations of the drawings. Thus, the directional terms are used to describe but not to limit this disclosure.

Figure 1:
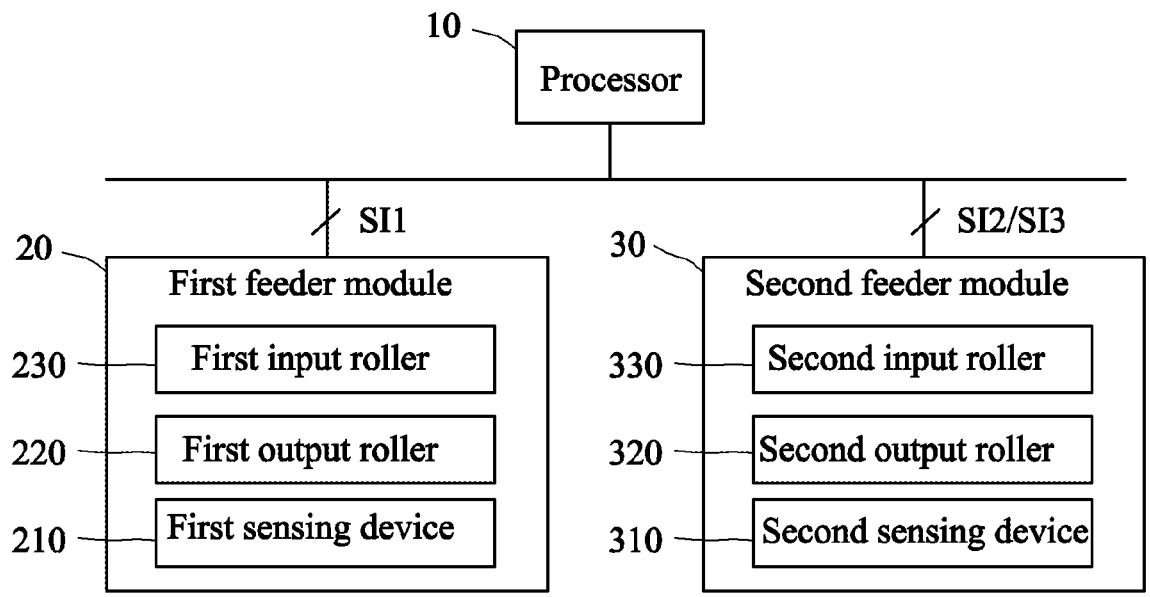
FIG. 1 is a schematic hardware block diagram showing a sheet feeder of this disclosure.
Figure 2:
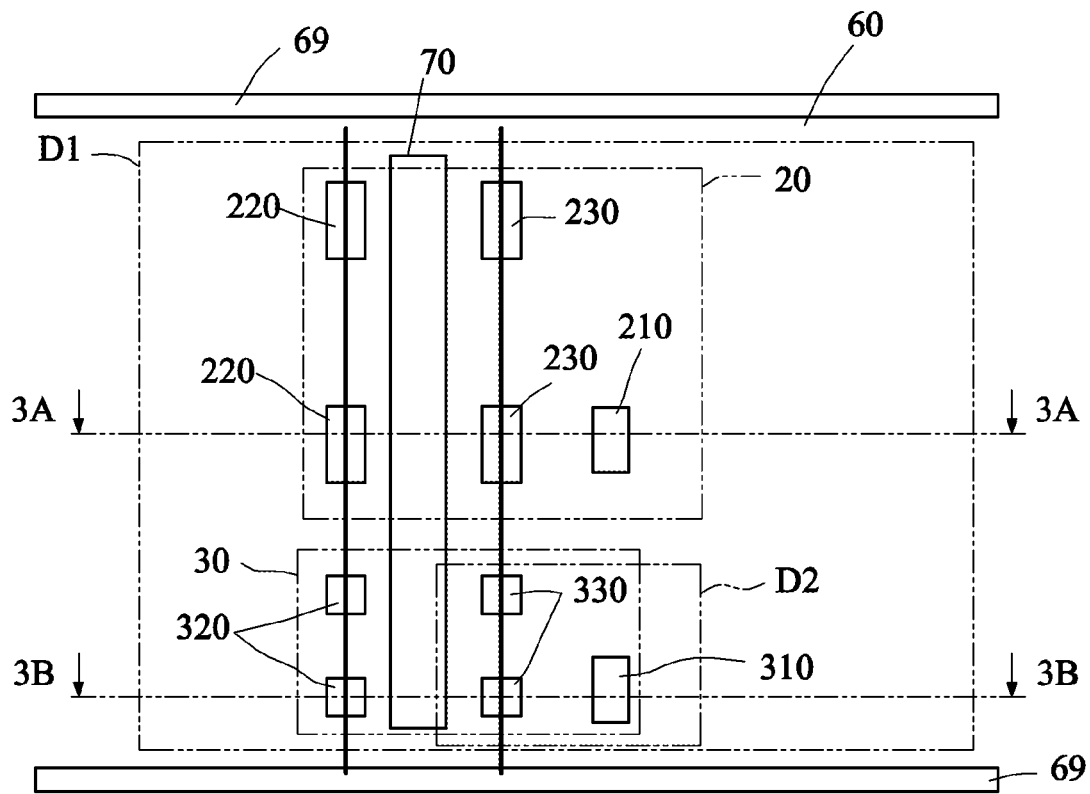
FIG. 2 is a schematic top view showing the sheet feeder of this disclosure.
Figure 3A:
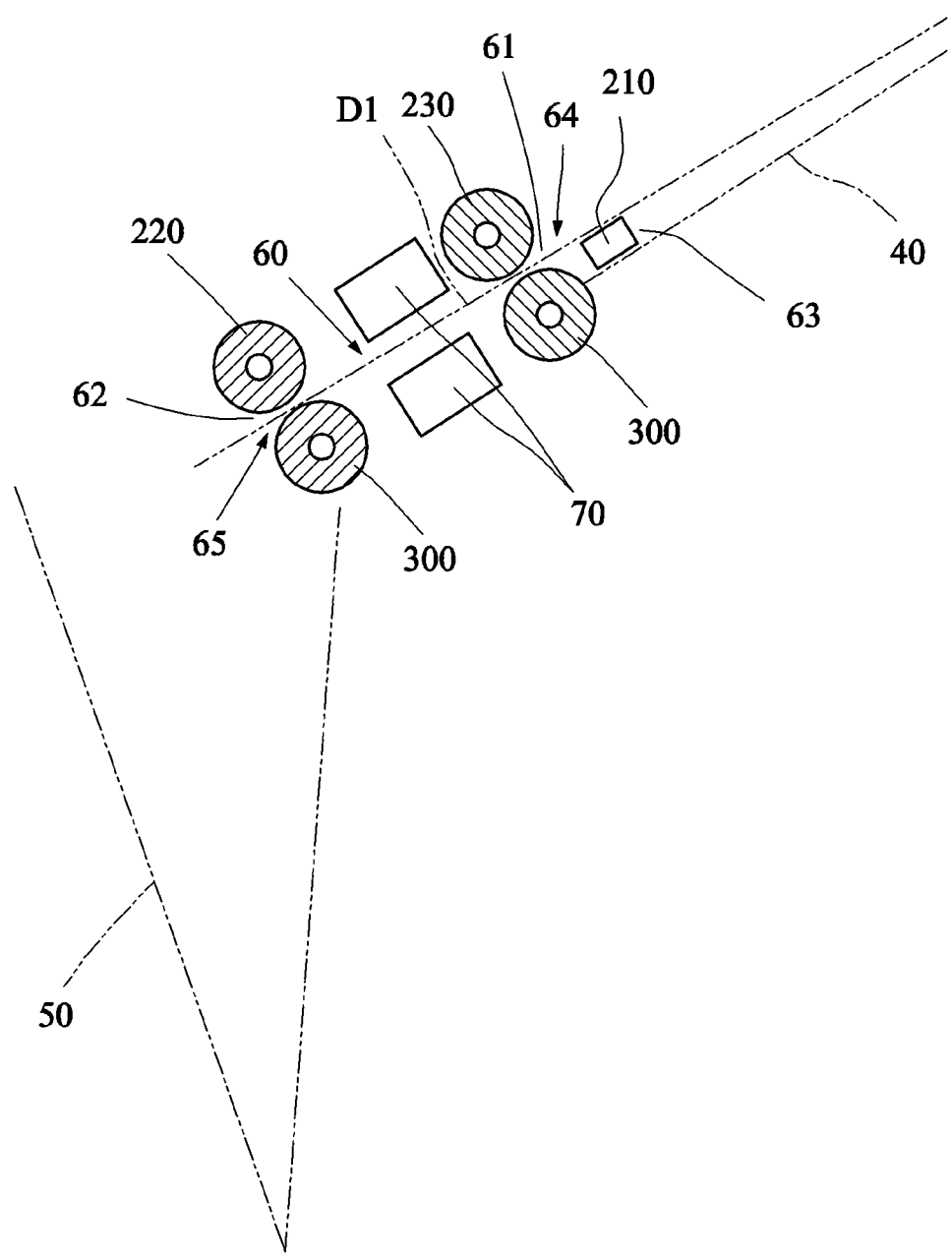
FIG. 3A is a schematically cross-sectional view taken along a line 3A-3A of FIG. 2.
Figure 3B:
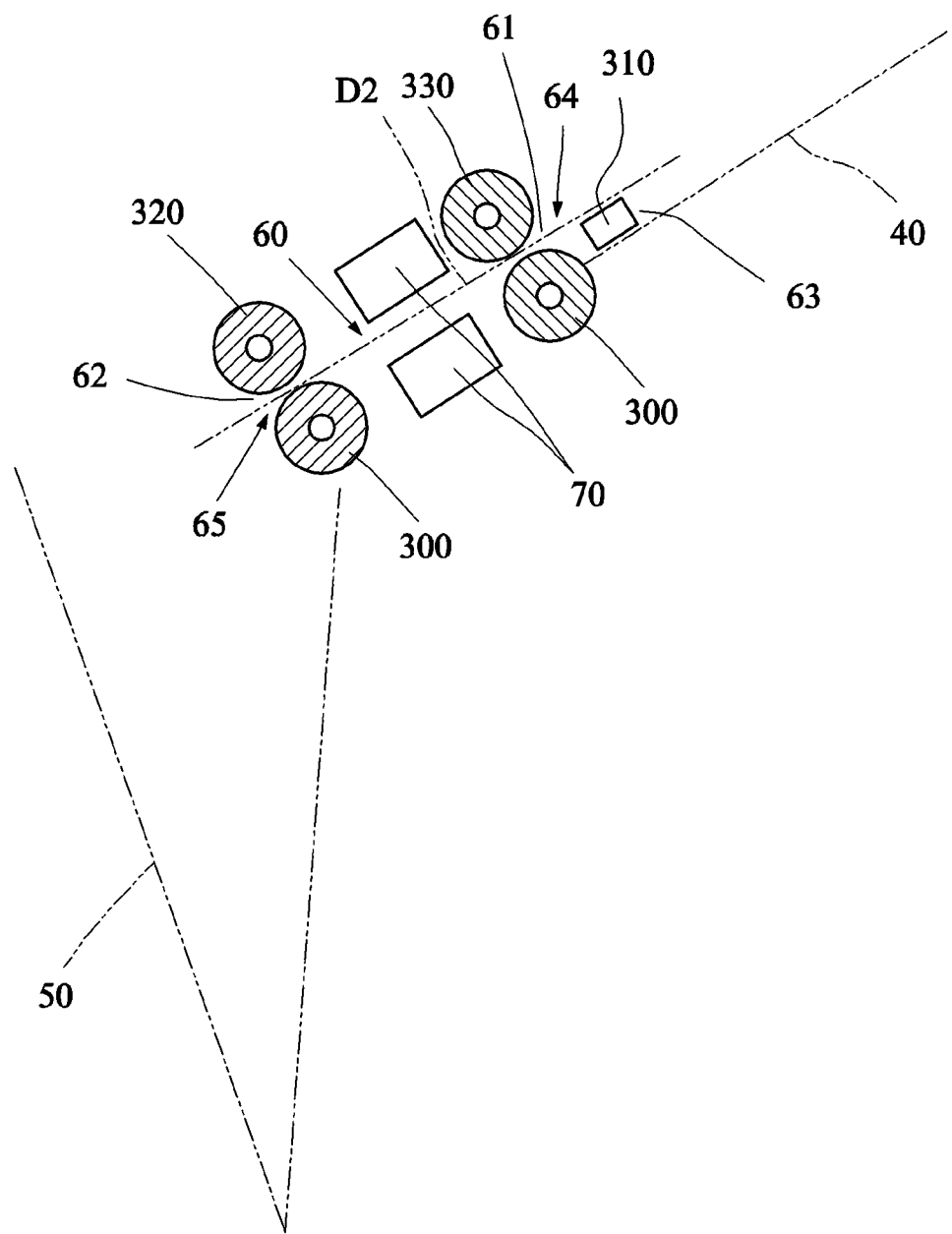
FIG. 3B is a schematically cross-sectional view taken along a line 3B-3B of FIG. 2.

FIG. 1 is a schematic hardware block diagram showing a sheet feeder of this disclosure. FIG. 2 is a schematic top view showing the sheet feeder of this disclosure. FIGS. 3A and 3B are schematically cross-sectional views taken along lines 3A-3A and 3B-3B of FIG. 2. Referring to FIGS. 1 to 3B, this disclosure provides a sheet feeder of an automatic document feeder. The sheet feeder includes a supply tray 40, a discharge tray 50, an input passage 60, a first feeder module 20, a second feeder module 30 and an image acquiring device 70. The supply tray 40 and the discharge tray 50 support a document or a medium. The image acquiring device 70 includes a sensor device constituted by, for example but without limitation to, a charge-coupled device (CCD) type image sensor or a contact image sensor (CIS). The input passage 60, through which the original, sheet or document passes, is defined by a housing 69 of the automatic document feeder.

The first feeder module 20 includes a first input roller 230, a first output roller 220 and a first sensing device 210. The first input roller 230 is disposed on an input end 61 of the input passage 60. The first output roller 220 is disposed on an output end 62 of the input passage 60. The first sensing device 210 is disposed near the first input roller 230. In addition, the first sensing device 210 generates a first signal SI1 transmitted to a processor 10 of the sheet feeder upon sensing presence of a medium D1 (e.g., an A4-sized document, also referred to as a first medium) on the supply tray 40. The second feeder module 30 includes a second input roller 330, a second output roller 320 and a second sensing device 310. The second input roller 330 is disposed on the input end 61 of the input passage 60. The second output roller 320 is disposed on the output end 62 of the input passage 60. The second sensing device 310 is disposed at an input location 63 of the input passage 60 (near the input end 61). The second sensing device 310 generates a second signal 512 transmitted to the processor 10 upon sensing presence of a medium D2 (e.g., certificate or card, also referred to as a second medium) on the supply tray 40. The image acquiring device 70 is disposed downstream of the first input roller 230 and upstream of the first output roller 220, and acquires an image of the medium D1 or D2. The processor 10 controls enabled states and disabled states of the first feeder module 20 and the second feeder module 30. The first sensing device 210 and the second sensing device 310 are disposed on the same input end 61. The numbers of the first input roller(s) 230 and the second input roller(s) 330 may be adjusted according to the requirements. The first input roller 230 and the second input roller 330 may share the same power source or may be respectively driven by different power sources. The first input roller 230 and the first output roller 220 may share the same power source. Idle rollers 300 are rotated by the above-mentioned rollers. The first feeder module 20 and the second feeder module 30 have different operations or different operation parameters (e.g., in the aspects of transporting range and transporting time).

Thus, the meaning that the processor 10 of this embodiment controls the enabled states and the disabled states of the first feeder module 20 and the second feeder module 30 will be explained in the following. The enabled state of the first feeder module 20 represents a first control state that the first feeder module 20 transports the medium D1 until the medium D1 is completely separated from or leave the first output roller 220 under the control of the processor 10 (the processor 10 enables the first feeder module 20). The enabled state of the second feeder module 30 represents a second control state that the second feeder module 30 transports the medium D2 without separating the medium D1 from the second output roller 320 (the medium D2 is still in direct contact with the second output roller 320) under the control of the processor 10 (the processor 10 enables the second feeder module 30). The disabled state of the first feeder module 20 represents that the first feeder module 20 does not enter the first control state (the processor 10 disables the first feeder module 20). The disabled state of the second feeder module 30 represents that the second feeder module 30 does not enter the second control state (the processor 10 disables the second feeder module 30). The first feeder module 20 and the second feeder module 30 may link with each other in one example, and may not link with each other in another example, and this embodiment is not particularly restricted. For example, when the media D1 and D2 have the same length along the transporting directions thereof, the time period and the length for which the first feeder module 20 transports the medium D1 are longer than the time period and the length for which the second feeder module 30 transports the medium D2.

Furthermore, the first sensing device 210 and the second sensing device 310 are disposed at two different positions of the input end 61 of the input passage 60. In other words, the first feeder module 20 and the second feeder module 30 share the same input passage 60, or even share the same sheet inlet 64 and the same sheet outlet 65 (different sheet inlets or different sheet outlets are provided in another embodiment). Consequently, the user cannot encounter the trouble in operating the ADF because the structure is different from that used in the conventional operation mode.

When the processor 10 receives the first signal SI1, it represents that the ordinary medium D1 is to be processed (e.g., image-acquired or copied). At this time, the processor 10 disables the operation of the second feeder module 30. Meanwhile, since the first feeder module 20 and the second feeder module 30 share the same sheet inlet 64, if the medium D1 (e.g., an A4-sized document) has the too-large area and concurrently covers the first sensing device 210 and the second sensing device 310, then both the first signal SI1 and the second signal SI2 should be transmitted to the processor 10 in a specific operation mode. At this time, the first sensing device 210 corresponds to the conventional sheet processing mode, so the first feeder module 20 is enabled with the higher priority, and the second feeder module 30 is disabled. Further, the second input roller 330 and the second output roller 320 rotate together with the first input roller 230 and the first output roller 220, and have the same rotation direction and speed.

However, if the processor 10 receives the second signal 512 without receiving the first signal SI1, then it represents that the medium D2 to be processed has the smaller area, or has the confidential or private data. At this time, the processor 10 disables the first feeder module 20, and thus enables rotating of the second input roller 330.

In summary, in the sheet feeder of the ADF, two feeder modules (the first feeder module 20 and the second feeder module 30) are provided for the same input passage 60, the same sheet inlet 64 and the same sheet outlet 65, and the first feeder module 20 and the second feeder module 30 have different operation mechanisms for processing different types of media D1 and D2.

Further, after the second feeder module 30 has been enabled, the second input roller 330 feeds the medium D2 into the input passage 60, so that the image acquiring device 70 performs an image acquiring operation on the medium D2. When the medium is being transported and after the second sensing device 310 has sensed that the medium D2 leaves, the second sensing device 310 generates a third signal SI3 transmitted to the processor 10. It is worth noting that the second sensing device 310 may sense whether the medium D2 leaves by the following technical contents. If the second sensing device 310 is a photo sensor, then the second sensing device 310 senses the difference between the light reflected by the medium D2 and the light reflected by the housing of the input passage 60 and thus generates the third signal SI3. If the second sensing device 310 is a sensing rocker arm, then after the medium D2 has been transported past the sensing rocker arm, the sensing rocker arm elastically moves to the state where no medium D2 passes, so that the sensing device generates the third signal SI3. The detailed contents thereof can be easily understood and will not be described in detail.

Moreover, after the processor 10 has received the third signal SI3 and after a predetermined time has elapsed, the rotating of the second output roller 320 is stopped. This predetermined time is counted from the timing, when the second sensing device 310 has sensed the boundary of the medium D2 (e.g., the rear edge or trailing edge) passing through the position of the second sensing device 310, to the timing, when the boundary of the medium D2 moves from the position of the second sensing device 310 past the image acquiring device 70 and stops at the second output roller 320. Thus, the medium D2 is nipped at the second output roller 320, and is free from flying (or being pushed out) and falling off the sheet outlet 65 due to the moving inertia of the medium D2 and the inertial force of the continuously rotating second output roller 320 if the second output roller 320 is not timely stopped.

Figure 4:
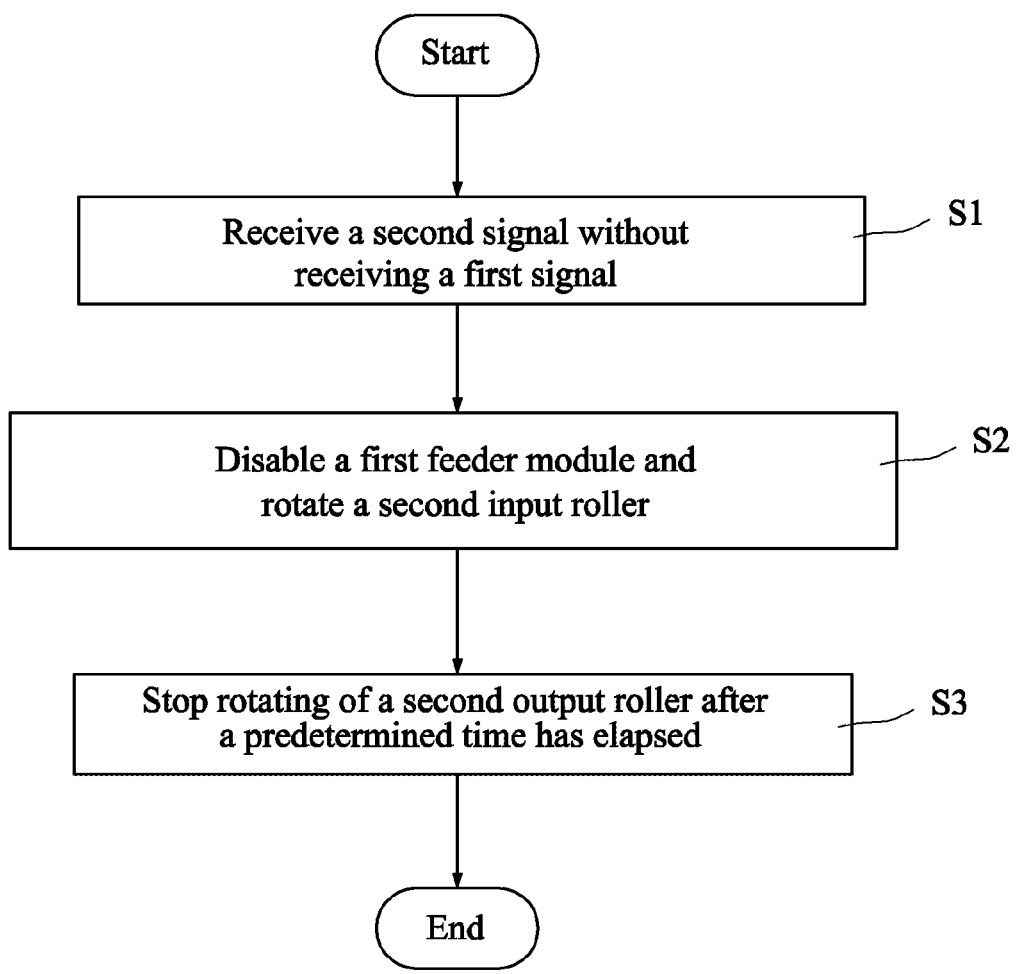
FIG. 4 is a flow chart showing a control method of the sheet feeder of this disclosure.

FIG. 4 is a flow chart showing a control method of the sheet feeder of this disclosure. Please refer to FIG. 4 in conjunction with FIGS. 1 to 3B. In order to solve the problem caused when the conventional ADF is scanning the hard medium, this disclosure also provides a control method of a processor of a sheet feeder of an automatic document feeder. The control method of the processor includes the following steps.

In step S1, the second signal SI2 is received, and the first signal SI1 is not received.

In step S2, the operation of the first feeder module 20 is disabled and the rotating of the second input roller 330 is enabled according to the result of the step S1. In this step, the image acquiring device 70 can be enabled to perform the image acquiring operation on the medium D2.

In step S3, after a predetermined time has elapsed, rotating of the second output roller 320 is stopped so that the medium D2 cannot be separated from or leave the second output roller 320. That is, the medium D2 can be still nipped by the second output roller 320 and the idle roller 300, so that the user can pull out the medium D2.

In detail, if the initial states of the first feeder module 20 and the second feeder module 30 are disabled states, then in the second step S2 when the first sensing device 210 does not sense presence of the medium D1, the first sensing device 210 is continuously kept in the disabled state. When the second sensing device 310 senses presence of the medium D2, the processor 10 receives the second signal SI2, and immediately enables the second feeder module 30 to rotate the second input roller 330 to feed the medium D2, so that the image acquiring device 70 can perform the image acquiring operation.

On the contrary, if the initial states of the first feeder module 20 and the second feeder module 30 are the enabled states, then in the second step S2 when the first sensing device 210 does not sense presence of the medium D1 and the second sensing device 310 senses the presence of the medium D2, the processor 10 receives only the second signal SI2, and immediately disables the first feeder module 20 and enables the second feeder module 30 to enter the enabled state or mode to rotate the second input roller 330 to feed the medium D2, so that the image acquiring device 70 can perform the image acquiring operation.

It is to be explained that this disclosure is to solve the problem that the small-area medium tends to fly out of the output end by the moving inertia of the medium and the inertial force of the continuously rotating output roller if the second output roller is not timely stopped when the straight or linear input passage is present between the sheet input location and the sheet output location of the ADF of the peripheral. So, this disclosure is applicable to the mechanism of the ADF, in which the input passage between the sheet input location and the sheet output location is the linear or straight passage, and the ADF may be applied to the peripheral and the scanner.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A sheet feeder having a supply tray and a discharge tray, the sheet feeder comprising:
   an input passage;
   a first feeder module, comprising:
      a first input roller disposed on an input end of the input passage;
      a first output roller disposed on an output end of the input passage; and
      a first sensing device being disposed near the first input roller, and generating a first signal transmitted to a processor upon sensing presence of a first medium on the supply tray;
   a second feeder module, comprising:
      a second input roller disposed on the input end of the input passage;
      a second output roller disposed on the output end of the input passage; and
      a second sensing device being disposed at an input location of the input passage, and generating a second signal transmitted to the processor upon sensing presence of a second medium on the supply tray; and
   an image acquiring device being disposed downstream of the first input roller and acquiring an image of the first medium or the second medium;
   wherein the processor controls enabled states and disabled states of the first feeder module and the second feeder module;
   wherein the first sensing device and the second sensing device are disposed on the same input end of the input passage.

2. The sheet feeder according to claim 1, wherein when the processor receives the first signal, the processor disables the second feeder module.

3. The sheet feeder according to claim 2, wherein the second input roller and the second output roller rotate together with the first input roller and the first output roller.

4. The sheet feeder according to claim 1, wherein when the processor receives the first signal and the second signal, the processor disables the second feeder module.

5. The sheet feeder according to claim 1, wherein when the processor receives the second signal but does not receive the first signal, the processor disables the first feeder module.

6. The sheet feeder according to claim 1, wherein the first feeder module and the second feeder module have different operation parameters.

7. The sheet feeder according to claim 1, wherein after the second sensing device senses that the second medium has left, the second sensing device generates a third signal transmitted to the processor.

8. The sheet feeder according to claim 7, wherein after the processor has received the third signal and a predetermined time has elapsed, the processor stops rotating of the second output roller to make the second medium be still in direct contact with the second output roller.

9. The sheet feeder according to claim 1, wherein the first sensing device and the second sensing device are disposed at two different positions of the input end of the input passage.

10. A control method of the processor of the sheet feeder according to claim 1, comprising steps of:
   receiving the second signal without receiving the first signal;
   disabling the first feeder module and rotating the second input roller; and
   stopping rotating of the second output roller after a predetermined time has elapsed to make the second medium be still in direct contact with the second output roller.

11. The sheet feeder according to claim 1, wherein the first medium disposed on the supply tray concurrently covers the first sensing device and the second sensing device so that both the first signal and the second signal are transmitted to the processor in a specific operation mode.

12. The sheet feeder according to claim 11, wherein the first feeder module is enabled, and the second feeder module is disabled in the specific operation mode.

13. The sheet feeder according to claim 1, wherein the input passage is a straight and linear input passage.

\* \* \* \* \*